(No Model.)
F. NUESSLE.
HANDLE FOR SURGICAL IMPLEMENTS.
No. 361,315. Patented Apr. 19, 1887.
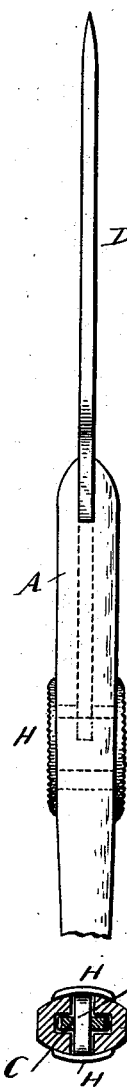
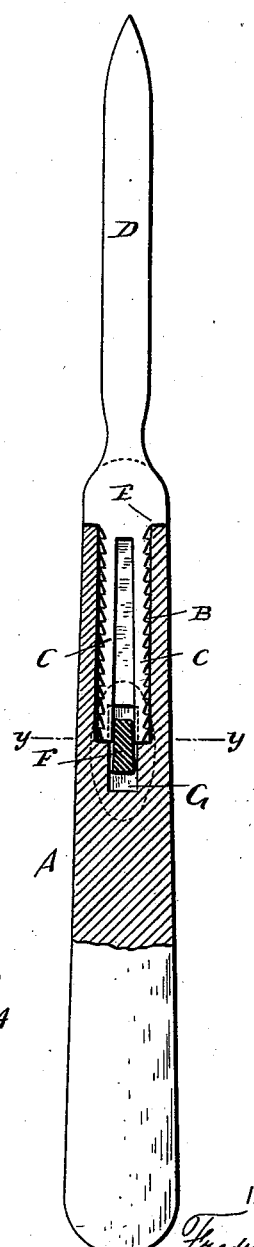
WITNESSES:
INVENTOR
Fredrick Nuessle
BY
his ATTORNEYS.
N. PETERS. Photo-Lithographer, Washington. D. C.

UNITED STATES PATENT OFFICE.

FREDRICK NUESSLE, OF BROOKLYN, NEW YORK.

HANDLE FOR SURGICAL IMPLEMENTS.

SPECIFICATION forming part of Letters Patent No. 361,315, dated April 19, 1887.

Application filed July 28, 1886. Serial No. 209,286. (No model.)

*To all whom it may concern:*

Be it known that I, FREDRICK NUESSLE, of Brooklyn, in the county of Kings and State of New York, have invented certain new and useful Improvements in Handles for Surgical Implements, of which the following is a specification.

This invention relates to certain new and useful improvements in handles for holding surgical implements, such as knives, saws, tweezers, &c.

The object of my invention is to provide a new and improved handle of this kind by which the knife is held firmly and securely, and in and from which the knife can be fastened or removed easily and rapidly.

The invention consists in the combination, with a handle having a longitudinal recess in one end for receiving a forked end of the blade, of a sliding wedge-piece in the handle, which wedge-piece is adapted to be forced in between the shanks or prongs of the forked end of the blade, the outer edges of such shanks being serrated, all as will be fully described and set forth hereinafter, and finally pointed out in the claims.

In the accompanying drawings, Figure 1 is a side view of a surgical implement provided with my improved handle. Fig. 2 is a sectional view, parts being broken out. Fig. 3 is an end view, parts being broken off; and Fig. 4 is a sectional view on the line *y y*, Fig. 2.

Similar letters of reference indicate corresponding parts.

The handle A, made of rubber, zylonite, celluloid, wood, metal or any suitable composition or material, is of the usual shape, and is provided at its upper end with a longitudinal recess, B, into which the forked end C of a blade, D, or other surgical implement, can be passed. The outer edges of the shanks of the forked end C are serrated, and at the upper ends of the shanks shoulders E are formed, which can rest against the upper end of the handle. A wedge-piece, F, is passed transversely through the handle and through longitudinal slots G of said handle, and to the ends of said wedge-piece plates or disks H are fastened, which are mounted to slide on the outside of the handle, said plates having their outer surfaces serrated or roughened, so as to prevent the fingers from slipping on the same.

The disks or plates H are moved downward until the wedge-piece rests on the bottom of the slot B, and then the forked end C of the blade or other implement is passed into the recess in the handle. The serrated plates H are then moved upward—that is, toward the blade—whereby the wedge-piece F is forced in between the ends of the shanks or prongs C, and said shanks or prongs are forced from each other, and their serrated edges are pressed against the sides of the recess B, whereby the blade is held securely on the handle. When the blade is to be removed, the slide-pieces H are moved downward, whereby the wedge-piece is withdrawn, thus permitting the shanks or prongs of the forked part to move toward each other under the action of the spring-tension in said prongs, and the same can then be withdrawn.

The recess B is preferably widened toward its lower end.

Having thus described my invention, I claim as new and desire to secure by Letters Patent—

1. A handle for surgical implements, provided with a transverse wedge-shaped piece mounted to slide in the handle in the direction of the length of said handle, substantially as shown and described.

2. A handle for surgical implements constructed with a transverse wedge-piece mounted to move in the handle in the direction of the length of said handle, said wedge-piece being provided with plates on its ends, which plates are on the outside of the handle, substantially as shown and described.

3. The combination, with a handle having a recess in one end, of a transverse wedge-piece mounted to slide in the direction of the length of the handle, which wedge-piece is provided with plates on its ends on the outside of the handle, and a blade or like surgical instrument having one end forked, substantially as shown and described.

In testimony that I claim the foregoing as my invention I have signed my name in presence of two subscribing witnesses.

FREDRICK NUESSLE.

Witnesses:
 HERMANN RAEGENER,
 LOUIS C. RAEGENER.